US012612061B2

(12) United States Patent
Dallas et al.

(10) Patent No.: US 12,612,061 B2
(45) Date of Patent: Apr. 28, 2026

(54) SYSTEM AND METHOD FOR LIVE REPLAY AND SUGGESTION FOR DRIVER SKILL IMPROVEMENT

(71) Applicant: TOYOTA RESEARCH INSTITUTE, INC., Los Altos, CA (US)

(72) Inventors: James Andrew Dallas, San Jose, CA (US); Steven M. Goldine, Sunnyvale, CA (US); Hanh T. Nguyen, Morgan Hill, CA (US); Andrew P. Best, Sunnyvale, CA (US); Michael Thompson, San Juan Capistrano, CA (US); John Subosits, Mountain View, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 229 days.

(21) Appl. No.: 18/481,150

(22) Filed: Oct. 4, 2023

(65) Prior Publication Data

US 2025/0115263 A1 Apr. 10, 2025

(51) Int. Cl.
*B60W 50/08* (2020.01)
*B60W 10/20* (2006.01)
(Continued)

(52) U.S. Cl.
CPC .......... *B60W 50/087* (2013.01); *B60W 10/20* (2013.01); *B60W 50/0098* (2013.01); *B60W 50/16* (2013.01); *B60W 2710/0666* (2013.01)

(58) Field of Classification Search
CPC ............... B60W 50/087; B60W 10/20; B60W 50/0098; B60W 50/16; B60W 2710/0666
See application file for complete search history.

(56) References Cited

U.S. PATENT DOCUMENTS 8,374,743 B2 * 2/2013 Salinger ............... G05D 1/0246
701/28
10,227,073 B2 * 3/2019 Urano ................... B60W 50/14
(Continued)

FOREIGN PATENT DOCUMENTS

CN 109910900 A * 6/2019 ............ B60W 50/16
CN 114750785 A * 7/2022 ............ B60W 10/18
(Continued)

OTHER PUBLICATIONS

DE-102016216986-A1 translation (Year: 2017).*
CN-109910900-A translation (Year: 2019).*
CN-114750785-A translation (Year: 2022).*

*Primary Examiner* — Kyle T Johnson
(74) *Attorney, Agent, or Firm* — SEYFARTH SHAW LLP

(57) ABSTRACT

A method for a replay driver skill improvement system is described. The method includes logging vehicle commands requested by a vehicle operator of an ego vehicle to perform a selected driving maneuver. The method also includes identifying one or more of the logged vehicle commands in which operation of the ego vehicle is outside of a predetermined threshold while performing the selected driving maneuver. The method further includes operating the ego vehicle according to the logged vehicle commands until the one or more of the logged vehicle commands in which operation of the ego vehicle is outside of the predetermined threshold are reached. The method also includes performing, through shared control with the vehicle operator, improved vehicle commands to complete the selected driving maneuver while operating the ego vehicle at or within the predetermined threshold.

20 Claims, 9 Drawing Sheets

(51) Int. Cl.
     *B60W 50/00*        (2006.01)
     *B60W 50/16*        (2020.01)

(56) References Cited

U.S. PATENT DOCUMENTS

| | | | |
|---|---|---|---|
| 10,246,101 B2 | 4/2019 | She et al. | |
| 10,543,853 B2 | 1/2020 | Toyoda et al. | |
| 11,059,517 B2 | 7/2021 | Szabo et al. | |
| 11,524,679 B2 * | 12/2022 | Hu | B60W 30/18109 |
| 2008/0254417 A1 | 10/2008 | Mohamed | |
| 2012/0083947 A1 * | 4/2012 | Anderson | G08G 1/166 |
| | | | 701/1 |
| 2015/0258996 A1 * | 9/2015 | Victor | B60W 40/09 |
| | | | 340/576 |
| 2015/0262484 A1 | 9/2015 | Victor et al. | |
| 2015/0284010 A1 | 10/2015 | Beardsley et al. | |
| 2016/0176440 A1 | 6/2016 | Witte et al. | |
| 2016/0257341 A1 * | 9/2016 | Lavoie | B60W 30/18036 |
| 2017/0088106 A1 * | 3/2017 | Fahland | B60T 8/1766 |
| 2018/0237030 A1 * | 8/2018 | Jones | B60W 60/0051 |

| | | | |
|---|---|---|---|
| 2019/0322273 A1 * | 10/2019 | Wu | B60W 30/09 |
| 2019/0389482 A1 * | 12/2019 | Michalakis | B60W 50/085 |
| 2020/0039584 A1 * | 2/2020 | Igarashi | B62D 1/286 |
| 2020/0189591 A1 * | 6/2020 | Mellinger, III | B62D 6/003 |
| 2020/0269839 A1 * | 8/2020 | Sato | B60W 30/18163 |
| 2020/0290646 A1 * | 9/2020 | Safour | B60W 50/14 |
| 2020/0387156 A1 | 12/2020 | Xu et al. | |
| 2020/0409362 A1 * | 12/2020 | Long | B60W 50/14 |
| 2023/0234576 A1 * | 7/2023 | Jung | B60W 30/0956 |
| 2024/0326781 A1 * | 10/2024 | Goh | B60W 30/18145 |
| 2024/0326841 A1 * | 10/2024 | Di Cairano | B60W 50/035 |
| 2024/0336282 A1 * | 10/2024 | Islam | B60W 60/0015 |
| 2025/0074476 A1 * | 3/2025 | Karino | B60W 50/14 |
| 2025/0115263 A1 * | 4/2025 | Dallas | B60W 10/20 |
| 2025/0347059 A1 * | 11/2025 | Menzenbach | E01C 23/088 |

FOREIGN PATENT DOCUMENTS

| | | | | |
|---|---|---|---|---|
| DE | 102016216986 A1 * | 6/2017 | | B60W 50/16 |
| EP | 2119617 A1 * | 11/2009 | | B60W 50/16 |
| EP | 3441838 A1 * | 2/2019 | | B60W 30/182 |
| GB | 2614314 A * | 7/2023 | | B60T 8/172 |

* cited by examiner

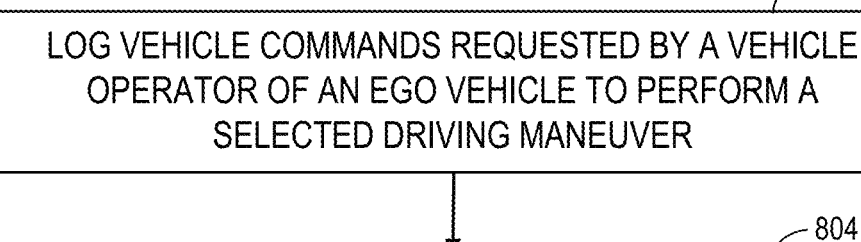

```
                                                            ┌─ 802
┌─────────────────────────────────────────────────────┐
│  LOG VEHICLE COMMANDS REQUESTED BY A VEHICLE        │
│  OPERATOR OF AN EGO VEHICLE TO PERFORM A            │
│  SELECTED DRIVING MANEUVER                          │
└─────────────────────────────────────────────────────┘
```

```
                                                            ┌─ 804
┌─────────────────────────────────────────────────────┐
│  IDENTIFY ONE OR MORE OF THE LOGGED VEHICLE         │
│  COMMANDS IN WHICH OPERATION OF THE EGO VEHICLE IS  │
│  OUTSIDE OF A PREDETERMINED THRESHOLD WHILE         │
│  PERFORMING THE SELECTED DRIVING MANEUVER           │
└─────────────────────────────────────────────────────┘
```

```
                                                            ┌─ 806
┌─────────────────────────────────────────────────────┐
│  OPERATE THE EGO VEHICLE ACCORDING TO THE LOGGED    │
│  VEHICLE COMMANDS UNTIL THE ONE OR MORE OF THE      │
│  LOGGED VEHICLE COMMANDS IN WHICH OPERATION OF      │
│  THE EGO VEHICLE IS OUTSIDE OF THE PREDETERMINED    │
│  THRESHOLD ARE REACHED                              │
└─────────────────────────────────────────────────────┘
```

```
                                                            ┌─ 808
┌─────────────────────────────────────────────────────┐
│  PERFORM, THROUGH SHARED CONTROL WITH THE           │
│  VEHICLE OPERATOR, IMPROVED VEHICLE COMMANDS TO     │
│  COMPLETE THE SELECTED DRIVING MANEUVER WHILE       │
│  OPERATING THE EGO VEHICLE AT OR WITHIN THE         │
│  PREDETERMINED THRESHOLD                            │
└─────────────────────────────────────────────────────┘
```

*FIG. 8*

SYSTEM AND METHOD FOR LIVE REPLAY AND SUGGESTION FOR DRIVER SKILL IMPROVEMENT

BACKGROUND

Field

Certain aspects of the present disclosure relate to autonomous vehicle technology and, more particularly, to a system and method for live replay and suggestion for driver skill improvement.

Background

Autonomous agents (e.g., vehicles, robots, etc.) rely on machine vision and sensors (IMU, GPS, etc.) for estimating the agent's state (velocity, position, etc.) for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle, then the autonomous vehicle with a higher-level number offers a greater combination and quantity of autonomous features relative to the other vehicle.

These various levels of autonomous vehicles may provide a safety system that improves driving of a vehicle by providing a set of advanced driver assistance system (ADAS) features, which may include electric stability control (ESC) systems. ESC systems are a type of shared control system that stabilizes vehicles under a restrictive target yaw rate where the rear tire forces are not saturated. For example, ESC systems provide real-time interaction with an operator in terms of allocating control through, for example, haptics, blended control, supervisory control, or discrete transitions. A process of using shared-control to show the driver how they could improve by replaying the actual situation in the car through shared-control, is desired.

SUMMARY

A method for a replay driver skill improvement system is described. The method includes logging vehicle commands requested by a vehicle operator of an ego vehicle to perform a selected driving maneuver. The method also includes identifying one or more of the logged vehicle commands in which operation of the ego vehicle is outside of a predetermined threshold while performing the selected driving maneuver. The method further includes operating the ego vehicle according to the logged vehicle commands until the one or more of the logged vehicle commands in which operation of the ego vehicle is outside of the predetermined threshold are reached. The method also includes performing, through shared control with the vehicle operator, improved vehicle commands to complete the selected driving maneuver while operating the ego vehicle at or within the predetermined threshold.

A non-transitory computer-readable medium having program code recorded thereon for a replay driver skill improvement system is described. The program code is executed by a processor. The non-transitory computer-readable medium includes program code to log vehicle commands requested by a vehicle operator of an ego vehicle to perform a selected driving maneuver. The non-transitory computer-readable medium also includes program code to identify one or more of the logged vehicle commands in which operation of the ego vehicle is outside of a predetermined threshold while performing the selected driving maneuver. The non-transitory computer-readable medium further includes program code to operate the ego vehicle according to the logged vehicle commands until the one or more of the logged vehicle commands in which operation of the ego vehicle is outside of the predetermined threshold are reached. The non-transitory computer-readable medium also includes program code to perform, through shared control with the vehicle operator, improved vehicle commands to complete the selected driving maneuver while operating the ego vehicle at or within the predetermined threshold.

A replay driver skill improvement system is described. The system includes a vehicle command module to log vehicle commands requested by a vehicle operator of an ego vehicle to perform a selected driving maneuver. The system also includes a low performance command identification module to identify one or more of the logged vehicle commands in which operation of the ego vehicle is outside of a predetermined threshold while performing the selected driving maneuver. The system further includes a vehicle command replay module to operate the ego vehicle according to the logged vehicle commands until the one or more of the logged vehicle commands in which operation of the ego vehicle is outside of the predetermined threshold are reached. The system also includes an improved command performance module to perform, through shared control with the vehicle operator, improved vehicle commands to complete the selected driving maneuver while operating the ego vehicle at or within the predetermined threshold.

This has outlined, broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 8 is a flowchart illustrating a method for a shared control, driving skill improvement system, according to aspects of the present disclosure.

DETAILED DESCRIPTION

Figure 1:
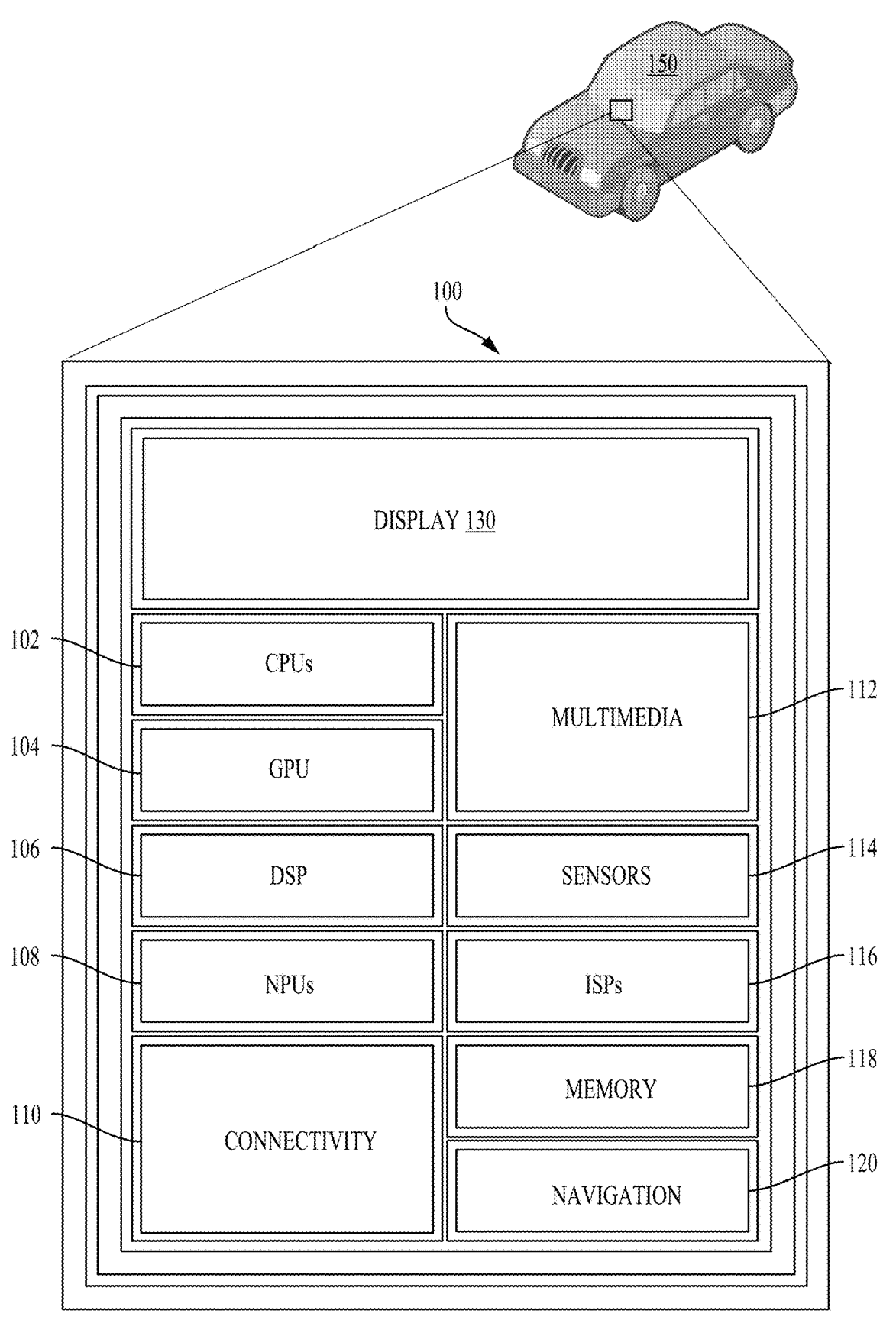
FIG. 1 illustrates an example implementation using a system-on-a-chip (SOC) for a replay driver skill improvement system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The National Highway Traffic Safety Administration ("NHTSA") has defined different "levels" of autonomous vehicles (e.g., Level 0, Level 1, Level 2, Level 3, Level 4, and Level 5). These various levels of autonomous vehicles may provide a safety system that improves driving of a vehicle. For example, in a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system and, in some configurations, intervene automatically in a guardian-mode as part of a shared control system.

In particular, a set of ADAS features may include an electric stability control (ESC) system. ESC systems are a type of shared control system that stabilizes vehicles under a restrictive target yaw rate where the rear tire forces are not saturated. In some cases, this constraint is designed to keep the vehicle within a region referred to as a stable handling envelope (SHE) region, which is an open-loop stable region, in which ordinary drivers can easily drive as intended. Many shared control research studies have been conducted within this region for practical advanced driver assistance systems, as this simplifies controller design and keeps the vehicle in an easier to control region where unstable dynamics can be avoided.

Existing technologies, such as ESC systems, explore ways in which autonomy can interact with an operator in terms of allocating control through, for example, haptics, blended control, supervisory control, or discrete transitions. These existing technologies interact with the user in real-time, as a task is executed. By contrast, various aspects of the present disclosure are directed to using shared control for providing the driver with a real-life demonstration to improve their driving. These aspects of the present disclosure replay the driving situation and demonstrate how the driver could improve; however, instead of using video, these aspects of the present disclosure replay the actual situation by operating the vehicle through shared control. In these aspects of the present disclosure, the driver is observed and then the actual replay demonstrates better behavior in a secondary demonstration.

Various aspects of the present disclosure are directed to utilization of shared control as a driver training tool. Specifically, in some aspects of the present disclosure, a replay driver skill improvement system observes the driver and in areas of improvement, shows how the driver can improve through live replay. These aspects of the present disclosure recreate the exact scenario the driver went through by tracking their commands up until an identified area of improvement. This area of improvement is automatically determined based on threshold criteria of the cost function and constraints (e.g., constraint is violated, or the driver's cost is 125% of optimal cost). In this example, once the controller places the car in the area of improvement, the controller demonstrates how to improve through applying feedback on the actuators, and executing the optimal commands to demonstrate how these improvements would help.

FIG. 1 illustrates an example implementation of the aforementioned system and method for a replay driver skill improvement system using a system-on-a-chip (SOC) 100 of a vehicle 150. The SOC 100 may include a single processor or multi-core processors (e.g., a central processing unit (CPU) 102), in accordance with certain aspects of the present disclosure. Variables, system parameters associated with a computational device, delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include sixth generation (6G) cellular network technology, fifth generation (5G) new radio (NR) technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to perform a live replay and suggestion for driver skill improvement. For example, a driver skill improvement system may recreate the exact scenario a driver went through by tracking their commands up until an identified area of improvement and providing shared vehicle control to illustrate improved driving skills.

The instructions loaded into a processor (e.g., CPU 102) may also include program code to log vehicle commands requested by a vehicle operator of an ego vehicle to perform a selected driving maneuver. The instructions loaded into a processor (e.g., CPU 102) may also include program code to identify one or more of the logged vehicle commands in which operation of the ego vehicle falls outside of a predetermined threshold while performing the selected driving maneuver. The instructions loaded into a processor (e.g., CPU 102) may also include program code to operate the ego vehicle according to the logged vehicle commands until the one or more of the logged vehicle commands in which operation of the ego vehicle falls below the predetermined threshold are reached. The instructions loaded into a processor (e.g., CPU 102) may also include program code to perform, through shared control with the vehicle operator, improved vehicle commands to complete the selected driving maneuver while operating the ego vehicle at or above the predetermined threshold.

Figure 2:
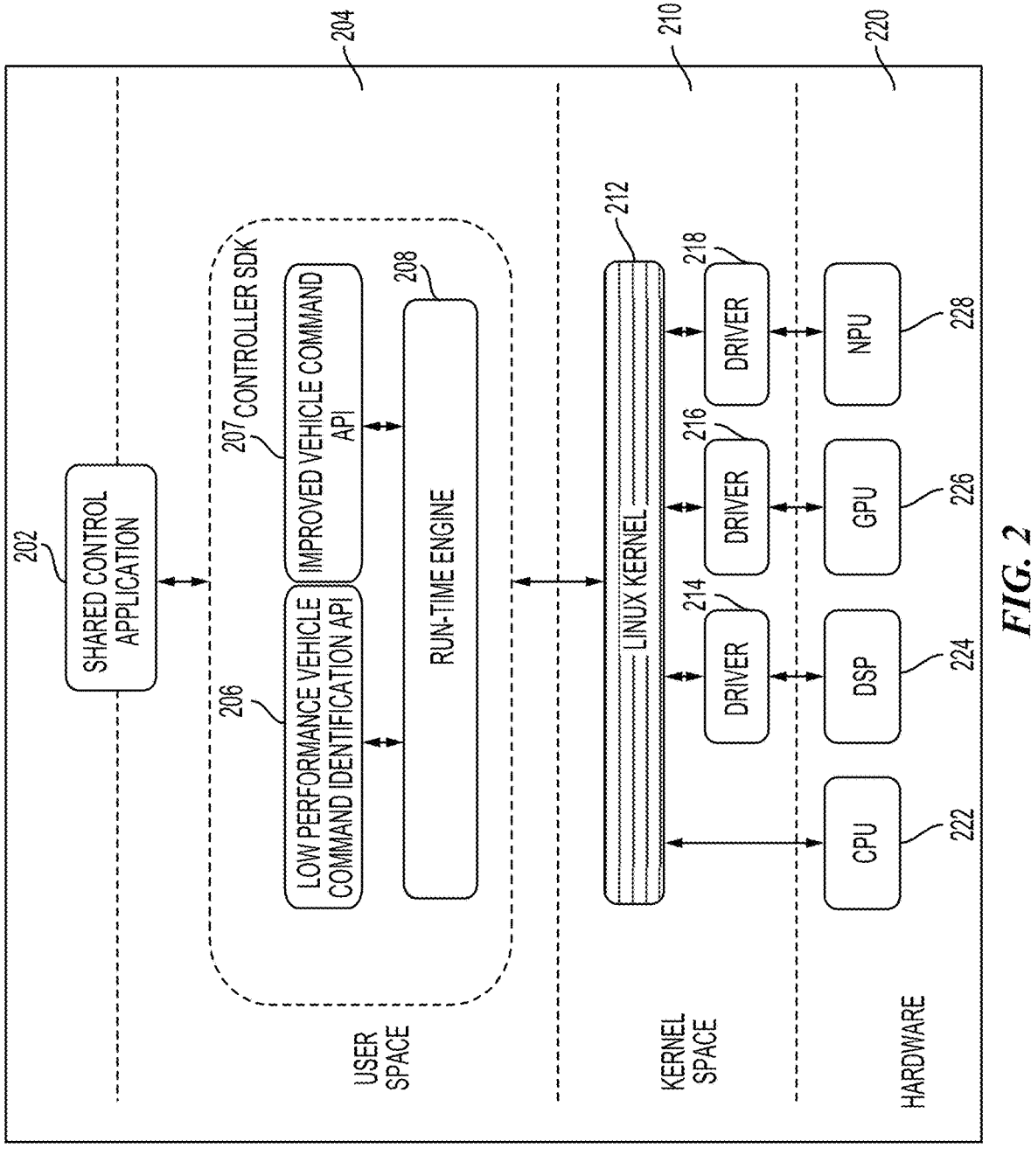
FIG. 2 is a block diagram illustrating a software architecture that may modularize artificial intelligence (AI) functions for a replay driver skill improvement system of an autonomous agent, according to aspects of the present disclosure.

FIG. 2 is a block diagram illustrating a software architecture 200 that may modularize artificial intelligence (AI) functions for a shared control, driving improvement system, according to aspects of the present disclosure. Using the architecture, a shared control application 202 may be designed such that it may cause various processing blocks of a system-on-a-chip (SOC) 220 (e.g., a CPU 222, a DSP 224, a GPU 226, and/or an NPU 228) to perform supporting computations during run-time operation of the shared control application 202. While FIG. 2 describes the software architecture 200 for shared vehicle control features, it should be recognized that shared control, driving skill improvement features are not limited to autonomous agents. According to aspects of the present disclosure, a shared control, driving skill improvement system is applicable to any vehicle type, provided the vehicle is equipped with appropriate functions of an advanced driver assistance system (ADAS).

The shared control application 202 may be configured to call functions defined in a user space 204 that may, for example, provide for shared vehicle control driving skill improvement services. The shared control application 202 may make a request to compile program code associated with a library defined in a low performance vehicle command identification application programming interface (API) 206 to identify one or more of the logged vehicle commands in which operation of the ego vehicle falls outside of a predetermined threshold while performing the selected driving maneuver. The shared control application 202 may also make a request to compile program code associated with a library defined in an improved vehicle command API 207 to operate the ego vehicle according to the logged vehicle commands until the one or more of the logged vehicle commands in which operation of the ego vehicle falls outside of the predetermined threshold are reached. In response, shared control with the vehicle operator performs improved vehicle commands to complete the selected driving maneuver while operating the ego vehicle at or within the predetermined threshold.

A run-time engine 208, which may be compiled code of a runtime framework, may be further accessible to the shared control application 202. The shared control application 202 may cause the run-time engine 208, for example, to take actions for communicating with a vehicle operator. When the vehicle operator begins to interact with a vehicle interface, the run-time engine 208 may in turn send a signal to an operating system 210, such as a Linux Kernel 212, running on the SOC 220. FIG. 2 illustrates the Linux Kernel 212 as software architecture for implementing vehicle eye tracking features of the vehicle. It should be recognized; however, aspects of the present disclosure are not limited to this exemplary software architecture. For example, other kernels may be used to provide the software architecture to support the shared vehicle control functionality using the adjust vehicle command functionality to provide improved shared vehicle control functionality outside a safe operating range.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, a nonlinear model predictive control may be configured to run on a combination of processing blocks, such as the CPU 222 and the GPU 226, or may be run on the NPU 228 if present.

Figure 3:
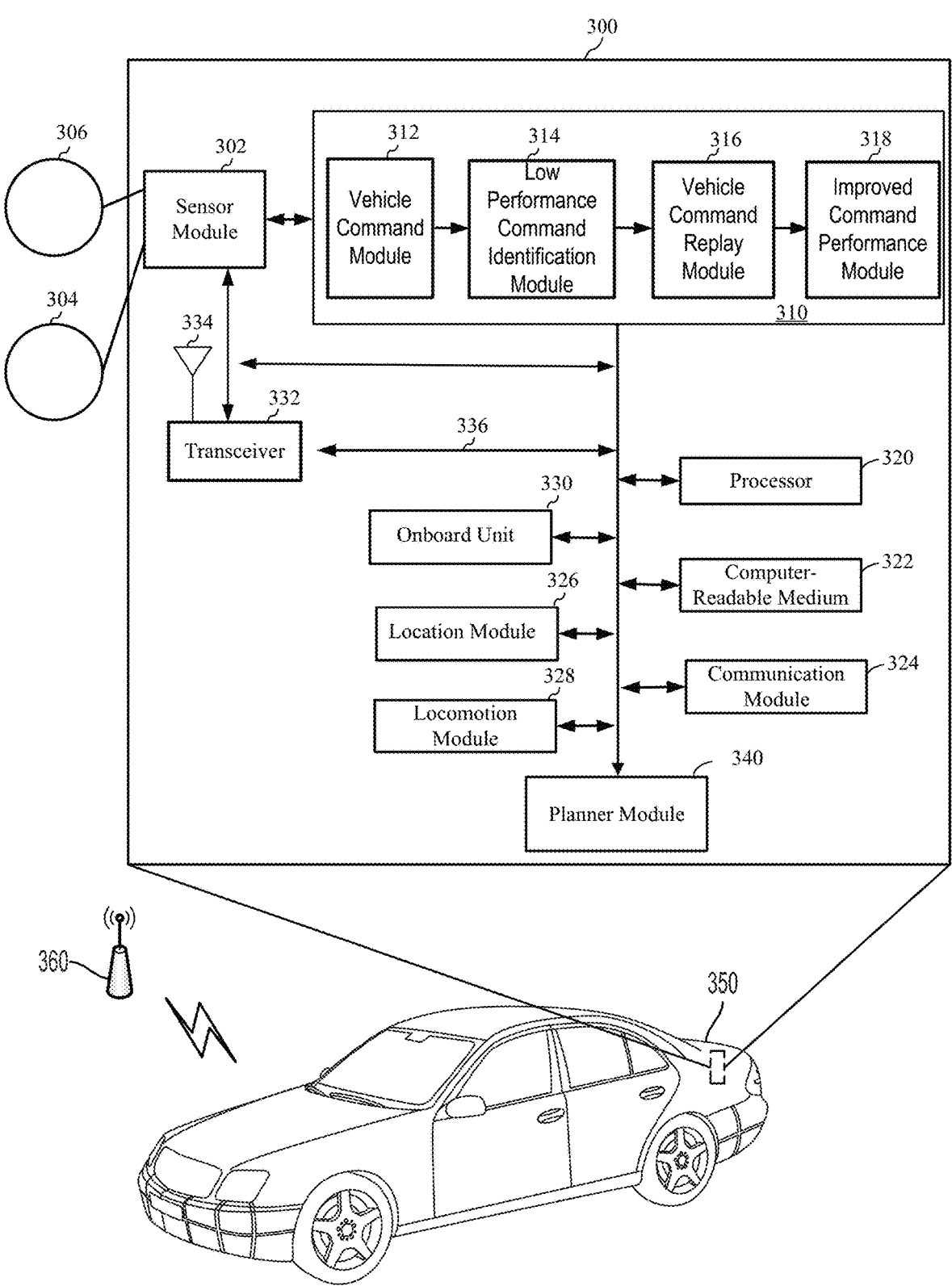
FIG. 3 is a diagram illustrating an example of a hardware implementation for a replay driver skill improvement system, according to aspects of the present disclosure.

FIG. 3 is a diagram illustrating an example of a hardware implementation for a shared vehicle control, driving improvement system 300, according to aspects of the present disclosure. The shared vehicle control, driving improvement system 300 may be configured to support shared vehicle control that provides ordinary drivers with expert level driving skills, such as performing a drifting maneuver during operation of a car 350. The shared vehicle control, driving improvement system 300 may be a component of a vehicle or other non-autonomous device (e.g., non-autonomous vehicles). For example, as shown in FIG. 3, the shared vehicle control, driving improvement system 300 is a component of the car 350.

Aspects of the present disclosure are not limited to the shared vehicle control, driving improvement system 300 being a component of the car 350. Other devices, such as a bus, motorcycle, or other like non-autonomous vehicle, are also contemplated for implementing the shared vehicle control, driving improvement system 300. In this example, the car 350 may be autonomous or semi-autonomous; however, other configurations for the car 350 are contemplated, such as an advanced driver assistance system (ADAS).

The shared vehicle control, driving improvement system 300 may be implemented with an interconnected architecture, such as a controller area network (CAN) bus, represented by an interconnect 308. The interconnect 336 may include any number of point-to-point interconnects, buses, and/or bridges depending on the specific application of the shared vehicle control, driving improvement system 300 and the overall design constraints. The interconnect 336 links together various circuits including one or more processors and/or hardware modules, represented by a sensor module 302, a shared vehicle controller 310, a processor 320, a computer-readable medium 322, a communication module 324, a location module 326, a locomotion module 328, an onboard unit 330, and a planner module 340. The interconnect 336 may also link various other circuits such as timing sources, peripherals, voltage regulators, and power management circuits, which are well known in the art, and therefore, will not be described further.

The shared vehicle control, driving improvement system 300 includes a transceiver 332 coupled to the sensor module 302, the shared vehicle controller 310, the processor 320, the computer-readable medium 322, the communication module 324, the location module 326, the locomotion module 328, the onboard unit 330, and the planner module 340. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the shared vehicle controller 310 to/from connected vehicles within the vicinity of the car 350.

The shared vehicle control, driving improvement system 300 includes the processor 320 coupled to the computer-readable medium 322. The processor 320 performs processing, including the execution of software stored on the computer-readable medium 322 to provide functionality according to the disclosure. The software, when executed by the processor 320, causes the shared vehicle control, driving improvement system 300 to predict the car 350 entering an unsafe operating range if a vehicle command requested by a vehicle operator of the car 350 is performed. The shared vehicle control, driving improvement system 300 is further caused to adjust the vehicle command to maintain control of the car 350 in the unsafe operating range. The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images of the vehicle operator. The second sensor 304 may be a ranging sensor, such as a light detection and ranging (LIDAR) sensor or a radio detection and ranging (RADAR) sensor for capturing an external vehicle environment. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the shared vehicle controller 310, the communication module 324, the location module 326, the locomotion module 328, the onboard unit 330, and/or the planner module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 326 may determine a location of the car 350. For example, the location module 326 may use a global positioning system (GPS) to determine the location of the car 350. The location module 326 may implement a dedicated short-range communication (DSRC)-compliant GPS unit. A DSRC-compliant GPS unit includes hardware and software to make the car 350 and/or the location module 326 compliant with one or more of the following DSRC standards, including any derivative or fork thereof: EN 12253:2004 Dedicated Short-Range Communication—Physical layer using microwave at 5.8 GHZ (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 6G, 5G NR. WiFi, long term evolution (LTE), 4G, 3G, etc. The communication module 324 may also communicate with other components of the car 350 that are not modules of the shared vehicle control, driving improvement system 300. The transceiver 332 may be a communications channel through a network access point 360. The communications channel may include DSRC, 6G, 5G NR, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G NR, 6G, LTE, LTE-V2X, LTE-D2D, VOLTE, or any other mobile data network or combination of mobile data networks. Further, the network access point 360 may include one or more IEEE 802.11 wireless networks.

The shared vehicle control, driving improvement system 300 also includes the planner module 340 for planning a route and controlling the locomotion of the car 350, via the locomotion module 328 for autonomous operation of the car 350. In one configuration, the planner module 340 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. These distinct levels of autonomous vehicles are described briefly below.

> Level 0: In a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle.
>
> Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.
>
> Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.
>
> Level 3: In a Level 3 ADAS vehicle, within known, limited environments (such as freeways), the driver can safely turn their attention away from driving tasks but is still be prepared to take control of the autonomous vehicle when needed.
>
> Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

> Level 5: In a Level 5 vehicle, other than setting the destination and starting the system, no human intervention is involved. The automated system can drive to any location where it is legal to drive and make its own decision (which may vary based on the district where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The shared vehicle controller 310 may be in communication with the sensor module 302, the processor 320, the computer-readable medium 322, the communication module 324, the location module 326, the locomotion module 328, the onboard unit 330, the transceiver 332, and the planner module 340. In one configuration, the shared vehicle controller 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the shared vehicle controller 310 may receive sensor data directly from the first sensor 306 and the second sensor 304 to determine, for example, input traffic data images.

Existing technologies, such as electric stability control (ESC) systems, explore ways in which autonomy can interact with an operator in terms of allocating control through, for example, haptic feedback, blended control, supervisory control, or discrete transitions. These existing technologies interact with the user in real-time, as a task is executed. By contrast, various aspects of the present disclosure are directed to using shared control for providing the driver with a real-life demonstration to improve their driving. These aspects of the present disclosure replay the driving situation and demonstrate how the driver could improve; however, instead of using video, these aspects of the present disclosure replay the actual situation by operating the vehicle through shared control. In these aspects of the present disclosure, the driver is observed and then the actual simulation demonstrates better behavior in a secondary demonstration.

Various aspects of the present disclosure are directed to utilization of shared control as a driver training tool. Specifically, in some aspects of the present disclosure, a replay driver skill improvement system observes the driver and in areas of improvement, shows how the driver can improve through live replay. These aspects of the present disclosure recreate the exact scenario the driver went through by tracking their commands up until an identified area of improvement. This area of improvement is automatically determined based on threshold criteria of the cost function and constraints (e.g., constraint is violated, or the driver's cost is 125% of optimal cost). In this example, once the controller places the car in the area of improvement, the controller demonstrates how to improve through applying feedback on the actuators, and executing the optimal commands to demonstrate how these improvements would help.

In these aspects of the present disclosure, the shared vehicle control, driving improvement system 300 may be utilized to extend a driving envelope of the car 350 to an unstable, controllable operating region envelope, which is defined by a larger area and sideslip to support higher vehicle agility. For example, improved vehicle command may illustrate operation within a maximum phase recovery envelope (MPRE), which refers to a boundary region in which maximum counter-steering can recover a vehicle state of the car 350 into a stability handling envelope (SHE) region.

As shown in FIG. 3, the shared vehicle control, driving improvement system 300 includes the shared vehicle controller 310 that includes a vehicle command module 312, a low performance command identification module 314, a vehicle command replay module 316, and an improved command performance module 318. The low performance command identification module 314, the vehicle command replay module 316, and the improved command performance module 318 may be using nonlinear model predictive control. The shared vehicle controller 310 is not limited to using nonlinear model predictive control.

The vehicle command module 312 is configured to log vehicle commands requested by a vehicle operator of an ego vehicle to perform a selected driving maneuver. In response to the requested vehicle commands, the low performance command identification module 314 is configured to identify one or more of the logged vehicle commands in which operation of the ego vehicle falls below a predetermined threshold while performing the selected driving maneuver. In response to detection of an unsafe vehicle command, the vehicle command replay module 316 is configured to operate the ego vehicle according to the logged vehicle commands until the one or more of the logged vehicle commands in which operation of the ego vehicle falls outside of the predetermined threshold are reached. Additionally, the improved command performance module 318 is configured to perform, through shared control with the vehicle operator, improved vehicle commands to complete the selected driving maneuver while operating the ego vehicle at or within the predetermined threshold.

As described in further detail below, circular drifting may be selected as the driving maneuver with a full-scale vehicle demonstrating the ability of the shared vehicle controller 310 to follow driver commands in safe states, while augmenting the driver commands to avoid situations of track bound violations and spin-out when drifting in a circle by intervening automatically in a guardian-mode. Various aspects of the present disclosure may be implemented in an agent, such as a vehicle. The vehicle may operate in either an autonomous mode, a semi-autonomous mode, or a manual mode. In some examples, the vehicle may switch between operating modes.

Figure 4A:
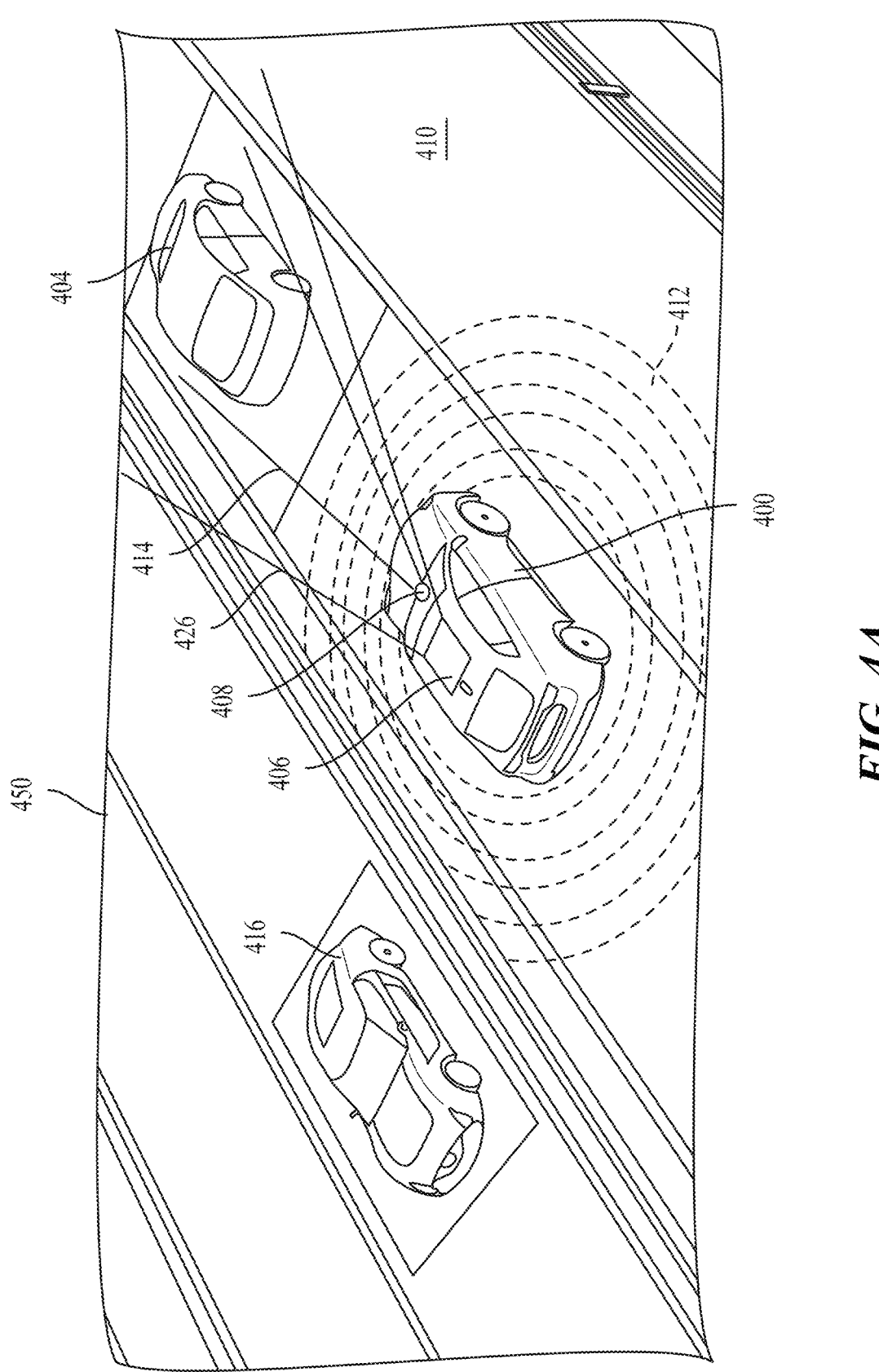
FIGS. 4A-4B are block diagrams illustrating a vehicle configured with a shared control, dynamic driving system, according to aspects of the present disclosure.
Figure 4B:
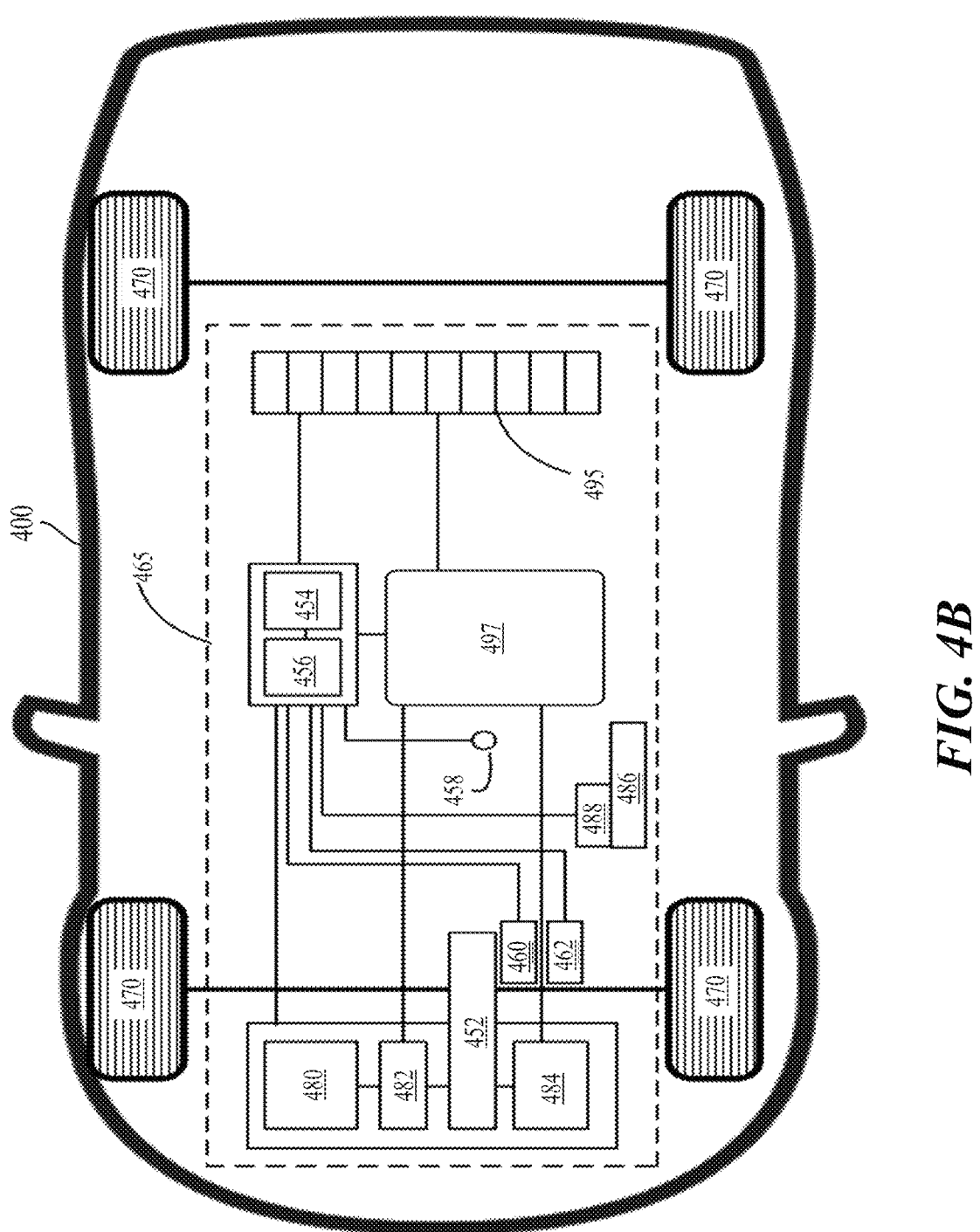

FIGS. 4A-4B are block diagrams illustrating a vehicle configured with a shared control, driving improvement system, according to aspects of the present disclosure.

FIG. 4A is a diagram illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the sensor module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward-facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

FIG. 4B is a diagram illustrating an example of a vehicle 400, in accordance with various aspects of the present disclosure. It should be understood that various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and

484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium-ion batteries, lead acid batteries, nickel cadmium batteries, lithium-ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules.

In various aspects of the present disclosure, implementation of the shared vehicle control, driving improvement system 300 of FIG. 3 in the vehicle 400 expands the shared control paradigm for the vehicle 400 for training a driver to operate in an unstable, controllable region. This expansion of the shared control paradigm improves safety in extreme vehicle conditions, such as tire saturation from encountering low friction or from emergency lane changes. While conventional approaches may sacrifice agility for stability by restricting the vehicle domain to operate in a stable handling envelope (SHE), the shared vehicle control, driving improvement system 300 expands existing shared control approaches to ensure safety outside the SHE region.

In various aspects of the present disclosure, the shared vehicle controller 310 is implemented using a nonlinear model predictive control framework that balances a cost to follow a driver's command with a cost for safety. According to this balance, the shared vehicle controller 310 does not disturb the driver in safe states and seamlessly limits intervention to situations that involve dangerous states. Specifically, the shared vehicle controller 310 implements a novel cost function that is formulated to identify driver low performance through an associated cost function.

Video plays a key role in training, skill-improvement, and skill preparation. Such examples include sports teams analyzing footage of their last game and drivers watching replays of their race to find areas of improvement. As autonomy has become increasingly capable of performing advanced skills at an expert level, it opens the possibility of another improvement tool; namely live replay and sugges-
tions. Various aspects of the present disclosure are directed
to a driving training methodology of learning advanced
driving skills.

Figure 5:
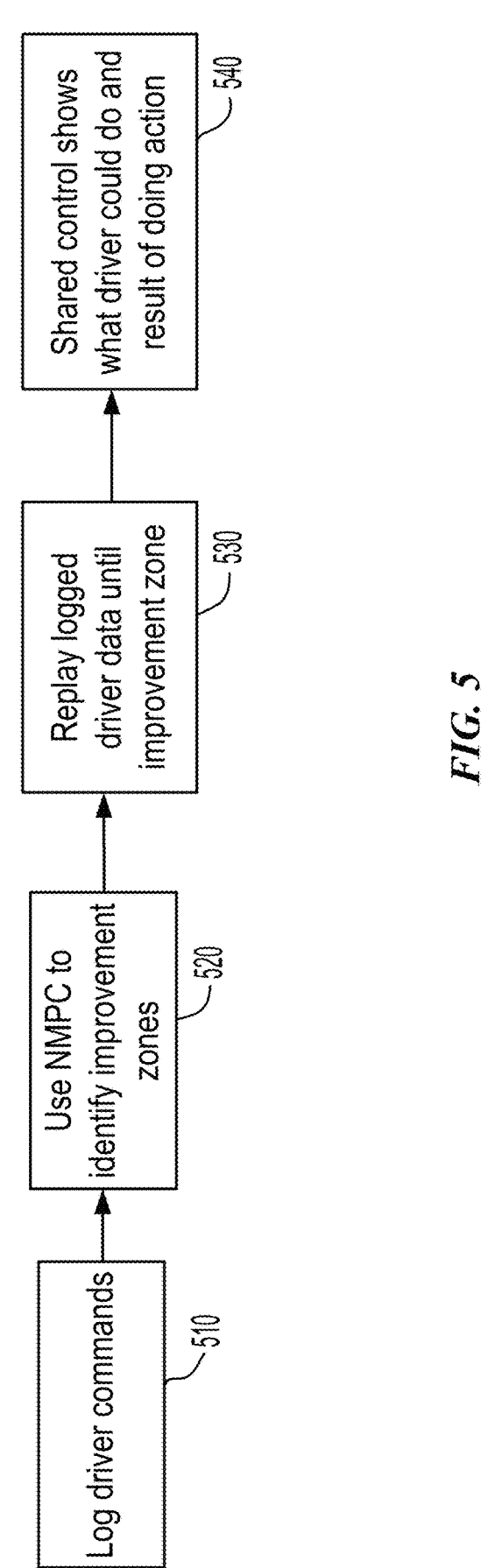
FIG. 5 is a block diagram illustrating a shared vehicle control, driving improvement process, according to various aspects of the present disclosure.

FIG. 5 is a block diagram illustrating a shared vehicle
control, driving improvement process 500, according to
various aspects of the present disclosure. As shown in FIG.
5, at block 510, a driver is first asked to perform a selected
driving maneuver, such as drifting during manual operation.
As this is happening, the training system records their
actions for control inputs ($u_{log}$) and vehicle states ($x_{log}$).

$$x = \begin{bmatrix} r \\ V \\ \beta \\ \omega_r \\ e \\ \Delta\phi \\ \delta \\ \tau \end{bmatrix} = \begin{bmatrix} \text{Yaw rate} \\ \text{Velocity} \\ \text{Sideslip} \\ \text{Real Wheelspeed} \\ \text{Lateral error} \\ \text{Course error} \\ \text{Roadwheel angle} \\ \text{Engine torque} \end{bmatrix}. \tag{1}$$

The control inputs are defined as:

$$u = \begin{bmatrix} \delta \\ \dot{\tau} \end{bmatrix} = \begin{bmatrix} \text{Roadwheel angle rate} \\ \text{Engine torque rate.} \end{bmatrix} \tag{2}$$

At block 520, it is determined whether an area for
improvement is detected, which autonomy identifies based
on threshold criteria with the cost function described in Eq.
(3). In this example, a use case is described in which the
driver drifts 75% of a doughnut and then spins out. In this
example, the threshold criteria would be exceeding the
maximal phase recovery envelope given by $J_{slack}$ of Eq. (1).

$$\min J = j_{tracking} + J_{driver} + J_{slack} \tag{3}$$

where $J_{tracking}$ is a cost on tracking a reference trajectory
(this is the optimal trajectory an expert would perform),
$J_{driver}$ is a cost on tracking the driver input commands (this
gives nonlinear model predictive control (NMPC) the ability
to follow driver intent), and $J_{slack}$ are costs on ensuring the
vehicle avoids safety constraints (such as a track edge) or
does not become unrecoverable (spin-out). By minimizing
this cost, an optimal action is given that can improve
performance as compared to the logged data.

Figure 6:
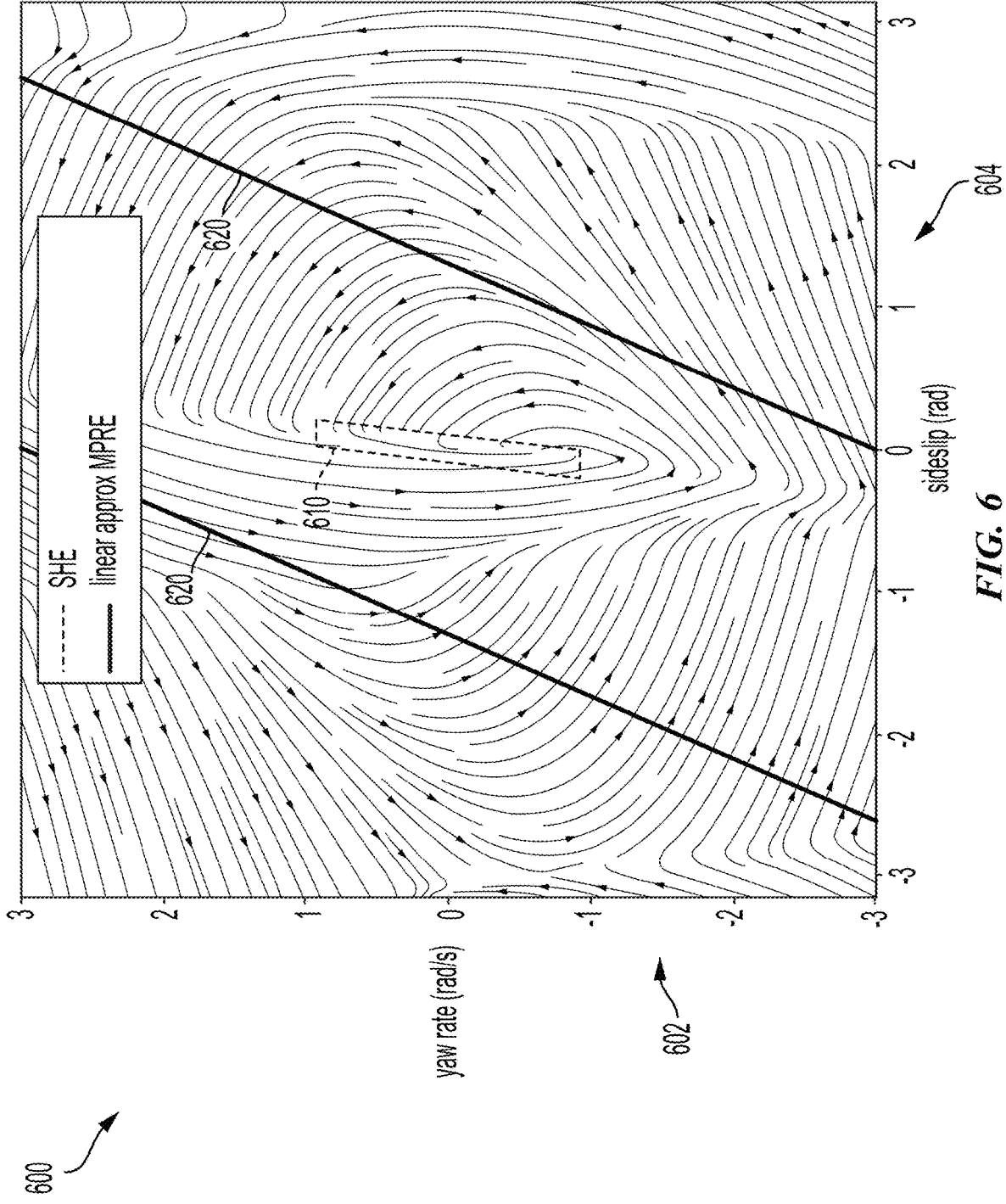
FIG. 6 is a graph illustrating a maximum phase recovery envelope (MPRE) relative to a stability handling envelope (SHE), according to various aspects of the present disclosure.

FIG. 6 is a maximum phase recovery envelope (MPRE)
graph 600 illustrating an MPRE region 620 relative to a
stability handling envelope (SHE) region 610, according to
various aspects of the present disclosure. Conventional
shared control systems rely on the SHE region 610 as a
vehicle stability envelope, which restricts the vehicle state to
a state space where the rear tires are not saturated, and the
vehicle is open-loop stable. Various aspects of the present
disclosure extend the SHE region 610 to the MPRE region
620, which is defined by a larger yaw rate 602 and sideslip
604 to allow higher agility, as shown in the MPRE graph
600. As described, the MPRE region 620 is defined as the
boundary region where maximum counter-steering can
recover the vehicle state into the SHE region 610.

As shown in FIG. 6, an approximated, the MPRE region
620 is shown relative to the SHE region 610, which is
enclosed in the MPRE region 620. In this example, the MPRE graph 600 shows a phase portrait is drawn with fixed
velocity and roadwheel angle (e.g., V=10 m/s and δ=−0.7
rad). The vehicle state moves along with the flow with the
fixed velocity V and the roadwheel angle δ. Additionally,
FIG. 6 shows a portion of an MPRE border. This phase
portrait is drawn with assumption of velocity (e.g., V=10
m/s) as the expected maximum speed during circular drifting
and roadwheel angle (e.g., δ=−0.7 rad) as a conservative
maximum counter-steering angle.

In this example, the vehicle state moves along the arrow
on the plot of the MPRE graph 600, with the fixed velocity
V and the roadwheel angle δ. For example, a left portion of
the MPRE region 620 is the separatrix on the plot which
divides the flow going into the SHE region and the flow
going to spin-out (β<−π), (e.g., the unstable region). In this
example, a right portion can be drawn with an opposite
maximum counter-steering. Additionally, the MPRE region
620 has a larger state space and allows the vehicle 400 to use
more control options than the SHE region 610. To prevent
excessive computational complexity in the model predictive
control (MPC) formulation, the MPRE region 620 is con-
structed by a linear approximation, shown in FIG. 6. A left
line of the MPRE region 620 is defined as:

$$r = MPRE_{p,q}(\beta) = p\beta + q. \tag{4}$$

From symmetry, a right line of the MPRE region 620 is
defined as $r=MPRE_{p,-q}(\beta)$. The upper and lower bounds of
the MPRE region 620 are not used because the subsequent
circular drifting experiment would not reach the upper and
lower bounds of the MPRE region. The parameters of the
straight line are determined based on the phase portrait (e.g.,
p=2.3 and q=3.0).

Referring again to FIG. 5, at block 530, a run with shared
control is performed. Specifically, autonomy replays the first
75% of the logged data of the last run prior to spin-out. This
process is performed by minimizing a tracking cost on the
control inputs, u (see Equation (2)), and driving states, x (see
Equation (1)). This is given as:

$$\min C = \text{sum}\left((x - x_{log})^2 + (u - u_{log})^2\right) \tag{5}$$

Effectively this puts the car and driver through the same
situation as the last run up until the identified area of
improvement (e.g., a point of spin-out). In other words, this
uses autonomy to recreate the logged scenario up until the
point of improvement. Once at the improvement point, at
block 540, two training mechanisms are activated. First, a
shared controller applies a haptic torque on the actuators
(e.g., steering wheel) and also applies inputs to the car. This
shared control formulation can take the form of a non-linear
model predictive control (NMPC), for example, as shown in
FIG. 6. Effectively, this puts drivers in the area where they
can improve (e.g., prevent spin-out) and shows them how to
improve by exerting a torque on the input modalities (steer-
ing) and commanding the car with an optimal action to show
how this change would improve performance. The ability to
improve performance comes out of the NMPC which seeks
to minimize a cost subject to some constraints. Here the cost
is defined in Equation (3).

Figures 7A, 7B:
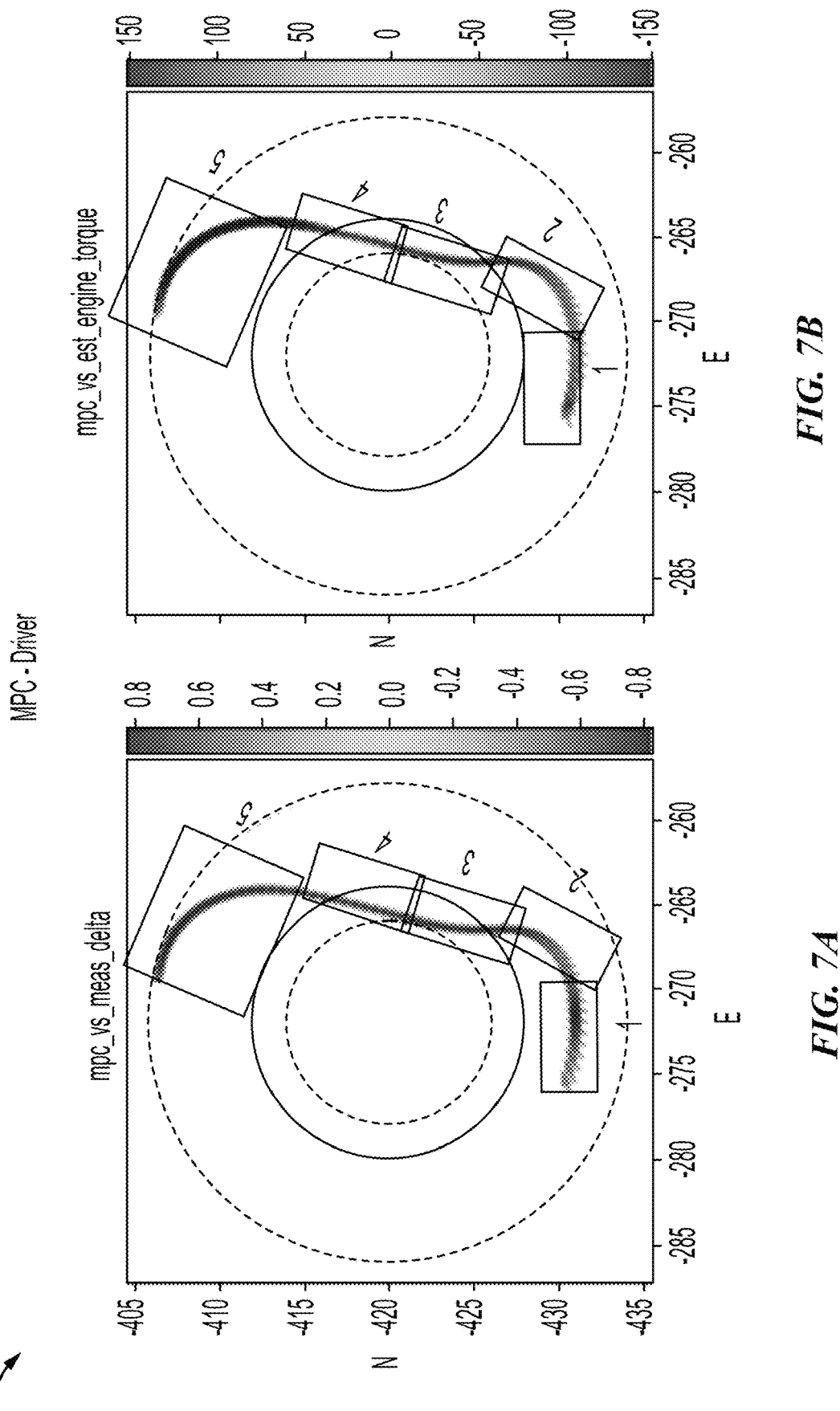
FIGS. 7A and 7B further illustrate a haptic shared control approach that replays driver commands, but intervenes with improved driver commands for driving training, according to various aspects of the present disclosure.

FIGS. 7A and 7B further illustrate a haptic shared control
approach that seeks to replay driver commands for improved
driving training, according to various aspects of the present disclosure. In this haptic shared control approach, a model predictive control (MPC) acts to replay vehicle commands that resulted in a violation of a safety constraint such as a spin-out or violating track bounds in response to performing the selected vehicle maneuver. In operation, if the driver's command causes a track-out, the MPC replays the driving maneuvers, and trains the driver to safely perform the driving maneuver by performing adjusted vehicle commands. In various aspects of the present disclosure, the MPC expands haptic shared control approaches to enable driving training in extreme and unstable domains, like drifting.

As shown in FIGS. 7A and 7B, reply of the driver commands show a constant 0 steering angle and an engine torque of 100 Nm. In this example, without shared control the driver caused a spin-out when performing the selected driving maneuver (e.g., drifting). FIGS. 7A and 7B depict replay of the vehicle path along with how much intervention the MPC gives for steering (e.g., FIG. 7A) and engine torque (e.g., FIG. 7B) as part of the adjusted vehicle commands during replay. The shades depict the amount of intervention. During the replay, the MPC performs adjusted commands depicted by the segment towards the bottom of FIGS. 7A and 7B to prevent the spin-out at the start (segment 1). Then there is little intervention (segment 2), followed by a slight intervention (segment 3) to prevent the driver from violating the inner track bounds (small, dashed circle) by performing further adjusted commands. After this, the driver commands are tracked with minimal intervention (segment 4); however, adjusted commands are performed again (section 5) to prevent violating the outer track bounds (large, dashed circle) during the initial run.

Various aspects of the present disclosure allow for live replay similar to video analysis. This works by recreating the exact scenario the driver went through by tracking their commands up until an identified area of improvement. This area of improvement is automatically determined based on threshold criteria of the cost function (e.g., constraint is violated, or the driver's cost is 125% of optimal cost). Then, once the controller places the car in the area of improvement, it demonstrates how to improve through applying feedback on the actuators, and executing the optimal commands to demonstrate how these improvements would help. A method for a shared vehicle control, driver improvement system is shown in FIG. 8.

FIG. 8 is a flowchart illustrating a method for a shared control, driving skill improvement system, according to aspects of the present disclosure. A method 800 begins at block 802, in which vehicle commands requested by a vehicle operator of an ego vehicle to perform a selected driving maneuver are logged. For example, as shown in FIG. 3, the shared vehicle control, driving improvement system 300 includes the shared vehicle controller 310 that includes a vehicle command module 312 configured to log vehicle commands requested by a vehicle operator of an ego vehicle to perform a selected driving maneuver.

At block 804, one or more of the logged vehicle commands are identified in which operation of the ego vehicle is outside of a predetermined threshold while performing the selected driving maneuver. For example, as shown in FIG. 3, in response to the requested vehicle commands, the low performance command identification module 314 is configured to identify one or more of the logged vehicle commands in which operation of the ego vehicle falls below a predetermined threshold while performing the selected driving maneuver. In various aspects of the present disclosure, the one or more of the logged vehicle commands are a violation of a safety constraint based on the cost associated with performing the one or more of the logged vehicle commands.

At block 806, the ego vehicle is operated according to the logged vehicle commands until the one or more of the logged vehicle commands in which operation of the ego vehicle is outside of the predetermined threshold are reached. For example, as shown in FIG. 3, in response to detection of an unsafe vehicle command, the vehicle command replay module 316 is configured to operate the ego vehicle according to the logged vehicle commands until the one or more of the logged vehicle commands in which operation of the ego vehicle falls outside of the predetermined threshold are reached.

At block 808, improved vehicle commands are performed through shared control with the vehicle operator to complete the selected driving maneuver while operating the ego vehicle at or within the predetermined threshold. For example, as shown in FIG. 3, the improved command performance module 318 is configured to perform, through shared control with the vehicle operator, improved vehicle commands to complete the selected driving maneuver while operating the ego vehicle at or within the predetermined threshold.

In some aspects of the present disclosure, the method shown in FIG. 8 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102), and/or other components included therein of the vehicle 150, or the shared vehicle control, driving improvement system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in numerous ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and nonlinear model predictive control described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a replay driver skill improvement system, the method comprising:

logging vehicle commands requested by a vehicle operator of an ego vehicle to perform a selected driving maneuver;

identifying one or more of the logged vehicle commands in which operation of the ego vehicle is outside of a predetermined threshold while performing the selected driving maneuver;

autonomously operating the ego vehicle according to the logged vehicle commands until the one or more of the logged vehicle commands in which operation of the ego vehicle is outside of the predetermined threshold are reached; and autonomously performing, through shared control feedback with the vehicle operator, improved vehicle commands to complete the selected driving maneuver while autonomously operating the ego vehicle at or within the predetermined threshold.

2. The method of claim 1, in which identifying the one or more of the logged vehicle commands comprises analyzing a cost associated with performing the one or more of the logged vehicle commands to determine whether the ego vehicle entered an unsafe operating range.

3. The method of claim 1, in which analyzing comprises determining the one or more of the logged vehicle commands are a violation of a safety constraint based on a cost associated with performing the one or more of the logged vehicle commands.

4. The method of claim 3, in which the safety constraint comprises a spin-out and/or a track bounds violation.

5. The method of claim 1, in which the selected driving maneuver comprises operation of the ego vehicle in an extreme and/or unstable domain.

6. The method of claim 5, in which operating the ego vehicle in the extreme and/or unstable domain comprises performing a drifting maneuver by the ego vehicle.

7. The method of claim 1, in which performing comprises providing haptic feedback to a driver of the ego vehicle during the performing of the improved vehicle commands.

8. The method of claim 1, in which the improved vehicle commands comprise an adjusted steering and/or engine torque of the ego vehicle.

9. A non-transitory computer-readable medium having program code recorded thereon for a replay driver skill improvement system, the program code being executed by a processor and comprising:

program code to log vehicle commands requested by a vehicle operator of an ego vehicle to perform a selected driving maneuver;

program code to identify one or more of the logged vehicle commands in which operation of the ego vehicle is outside of a predetermined threshold while performing the selected driving maneuver;

program code to autonomously operate the ego vehicle according to the logged vehicle commands until the one or more of the logged vehicle commands in which operation of the ego vehicle is outside of the predetermined threshold are reached; and program code to autonomously perform, through shared control feedback with the vehicle operator, improved vehicle commands to complete the selected driving maneuver while autonomously operating the ego vehicle at or within the predetermined threshold.

10. The non-transitory computer-readable medium of claim 9, in which the program code to identify the one or more of the logged vehicle commands comprises program code to analyze a cost associated with performing the one or more of the logged vehicle commands to determine whether the ego vehicle entered an unsafe operating range.

11. The non-transitory computer-readable medium of claim 9, in which the program code to analyze comprises program code to determine the one or more of the logged vehicle commands are a violation of a safety constraint based on a cost associated with performing the one or more of the logged vehicle commands.

12. The non-transitory computer-readable medium of claim 11, in which the safety constraint comprises a spin-out and/or a track bounds violation.

13. The non-transitory computer-readable medium of claim 9, in which the selected driving maneuver comprises operation of the ego vehicle in an extreme and/or unstable domain.

14. The non-transitory computer-readable medium of claim 13, in which the program code to operate the ego vehicle in the extreme and/or unstable domain comprises program code to perform a drifting maneuver by the ego vehicle.

15. The non-transitory computer-readable medium of claim 9, in which the program code to perform comprises program code to provide haptic feedback to a driver of the ego vehicle during the performing of the improved vehicle commands.

16. The non-transitory computer-readable medium of claim 9, in which the improved vehicle commands comprise an adjusted steering and/or engine torque of the ego vehicle.

17. A replay driver skill improvement system, the system comprising:

a vehicle command module to log vehicle commands requested by a vehicle operator of an ego vehicle to perform a selected driving maneuver;

a low performance command identification module to identify one or more of the logged vehicle commands in which operation of the ego vehicle is outside of a predetermined threshold while performing the selected driving maneuver;

a vehicle command replay module to autonomously operate the ego vehicle according to the logged vehicle commands until the one or more of the logged vehicle commands in which operation of the ego vehicle is outside of the predetermined threshold are reached; and an improved command performance module to autonomously perform, through shared feedback control with the vehicle operator, improved vehicle commands to complete the selected driving maneuver while autonomously operating the ego vehicle at or within the predetermined threshold.

18. The system of claim 17, in which the low performance command identification module is further used to determine the one or more of the logged vehicle commands are a violation of a safety constraint based on a cost associated with performing the one or more of the logged vehicle commands.

19. The system of claim 18, in which the safety constraint comprises a spin-out and/or a track bounds violation.

20. The system of claim 17, in which the selected driving maneuver comprises operation of the ego vehicle in an extreme and/or unstable domain through an adjusted steering and/or engine torque of the ego vehicle.

* * * * *